(12) United States Patent
Kuebler et al.

(10) Patent No.: US 11,028,503 B2
(45) Date of Patent: Jun. 8, 2021

(54) METHOD FOR OPERATING A SPINNING MACHINE OF A ROTOR SPINNING MACHINE, AND SPINNING MACHINE OF A ROTOR SPINNING MACHINE

(71) Applicant: Maschinenfabrik Rieter AG, Winterthur (CH)

(72) Inventors: Markus Kuebler, Geislingen (DE); Constantin Rieger, Gingen (DE)

(73) Assignee: Maschinenfabrik Rieter AG, Winterthur (CH)

( * ) Notice: Subject to any disclaimer, the term of this patent is extended or adjusted under 35 U.S.C. 154(b) by 37 days.

(21) Appl. No.: 16/280,402

(22) Filed: Feb. 20, 2019

(65) Prior Publication Data

US 2019/0257007 A1    Aug. 22, 2019

(30) Foreign Application Priority Data

Feb. 21, 2018   (DE) ..................... 10 2018 103 876.3

(51) Int. Cl.
*D01H 11/00* (2006.01)
*D01H 4/12* (2006.01)
(Continued)

(52) U.S. Cl.
CPC ............. *D01H 11/005* (2013.01); *D01H 4/10* (2013.01); *D01H 4/12* (2013.01); *D01H 4/24* (2013.01); *F16C 32/0476* (2013.01)

(58) Field of Classification Search
CPC .. D01H 4/10; D01H 4/12; D01H 4/24; D01H 4/22; D01H 4/26; D01H 11/005
See application file for complete search history.

(56) References Cited

U.S. PATENT DOCUMENTS 3,934,396 A * 1/1976 Stahlecker ............... D01H 4/12
                                                        57/406
4,038,812 A * 8/1977 Stahlecker ............... D01H 4/24
                                                        57/301
(Continued)

FOREIGN PATENT DOCUMENTS

DE         41 31 666 A1     3/1993
DE         197 18 768 A1    11/1998
(Continued)

OTHER PUBLICATIONS

English translation of DE10133152, obtained via espacenet.com, last visited May 21, 2020.*

(Continued)

*Primary Examiner* — Shaun R Hurley
*Assistant Examiner* — Patrick J. Lynch
(74) *Attorney, Agent, or Firm* — Dority & Manning, P.A.

(57) ABSTRACT

A method for operating a spinning device of a rotor spinning machine, and associated rotor spinning machine are provided in which a spinning rotor includes a rotor cup and a rotor shaft that is set into rotation with the aid of a drive situated in a drive housing. The drive is operatively connected to the rotor shaft, and the rotor shaft is supported in the drive housing by a bearing. The rotor cup is situated in a rotor housing to which vacuum is applied, and the rotor shaft extends between the drive housing and the rotor housing through a connection opening such that when a vacuum is drawn in the rotor housing during a spinning process, a vacuum is also drawn in the drive housing. Compressed air is feed into the drive housing via an air inlet at intervals to clean one or both of the drive housing and the bearing.

15 Claims, 4 Drawing Sheets

(51) Int. Cl.
*F16C 32/04* (2006.01)
*D01H 4/10* (2006.01)
*D01H 4/24* (2006.01)

(56) References Cited

U.S. PATENT DOCUMENTS

| | | | | |
|---|---|---|---|---|
| 4,055,942 | A * | 11/1977 | Stahlecker | D01H 4/50 57/263 |
| 4,069,654 | A * | 1/1978 | Roehrich | D01H 4/24 57/302 |
| 4,114,356 | A * | 9/1978 | Eckhardt | D01H 4/50 57/263 |
| 4,403,472 | A * | 9/1983 | Lattion | D01H 4/24 57/302 |
| 4,848,072 | A * | 7/1989 | Sakai | D01H 1/115 57/261 |
| 4,958,486 | A * | 9/1990 | Stahlecker | D01H 15/002 242/475.1 |
| 5,203,157 | A * | 4/1993 | Stahlecker | D01H 1/115 242/475.1 |
| 5,367,867 | A | 11/1994 | Lovas et al. | |
| 5,634,602 | A * | 6/1997 | Gobbels | B65H 54/343 242/125.1 |
| 5,802,835 | A * | 9/1998 | Stephan | D01H 13/005 251/129.12 |
| 6,094,901 | A * | 8/2000 | Schermer | D01H 4/40 57/304 |
| 2015/0361593 | A1* | 12/2015 | Burchert | D01H 4/12 57/406 |
| 2017/0342604 | A1* | 11/2017 | Pohn | D01H 4/08 |

FOREIGN PATENT DOCUMENTS

| | | | | |
|---|---|---|---|---|
| DE | 10133152 A1 * | 2/2002 | | D01H 4/32 |
| DE | 10231124 A1 * | 1/2004 | | D01H 4/12 |
| DE | 10 2012 005 390 A1 | 9/2013 | | |
| DE | 10 2012 015 420 A1 | 2/2014 | | |
| DE | 10 2015 121 963 A1 | 6/2017 | | |
| EP | 0 071 893 A2 | 2/1983 | | |
| EP | 1352997 A1 * | 10/2003 | | D01H 4/00 |
| EP | 2 069 562 B1 | 3/2014 | | |
| EP | 3 184 678 A1 | 6/2017 | | |
| WO | WO-2008037325 A1 * | 4/2008 | | D01H 11/005 |

OTHER PUBLICATIONS

English translation of DE10231124, obtained via espacenet.com, last visited May 21, 2020.*
German Patent Office Search Report, dated Dec. 7, 2018.
EP Search Report, dated Jul. 24, 2019.

* cited by examiner

METHOD FOR OPERATING A SPINNING MACHINE OF A ROTOR SPINNING MACHINE, AND SPINNING MACHINE OF A ROTOR SPINNING MACHINE

FIELD OF THE INVENTION

The present invention relates to a method for operating a spinning device of a rotor spinning machine, in which a spinning rotor comprising a rotor cup and a rotor shaft is set into rotation with the aid of a drive situated in a drive housing. The drive is operatively connected to the rotor shaft, and the rotor shaft is mounted in the drive housing with the aid of a contactless bearing, in particular, a magnetic bearing. The rotor cup is situated in a rotor housing, which is acted upon with a vacuum. Furthermore, the rotor shaft extends through a connection opening between the drive housing and the rotor housing, and so the drive housing is also under vacuum during the spinning process. Compressed air is fed into the drive housing via an air inlet. The invention also relates to a spinning device of a rotor spinning machine.

BACKGROUND

In such spinning devices, a complete seal cannot be implemented between the drive housing and the rotor housing. Therefore, a vacuum also builds up in the drive housing during the spinning operation. If the rotor housing, which is under vacuum, is now opened, a sudden pressure equalization therefore takes place there, while a vacuum still prevails in the drive housing. This results in impurities from the rotor housing being sucked into the drive housing. If the impurities enter the drive of the spinning rotor or the bearing, this can result in a failure of both the bearing and the drive.

EP 2 069 562 B1 therefore provides that a pressure equalization is carried out in the drive housing before the rotor housing is opened. For this purpose, compressed air is fed to the drive housing via an air inlet every time before the rotor housing is opened. As a result, the sucking-in of impurities can be avoided only during the opening of the rotor housing, however.

According to DE 10 2012 005 390 A1, a pressure equalization in the drive housing is to be carried out continuously, i.e., even during the spinning process. For this purpose, ambient air is continuously fed to the drive housing via an opening. The opening is provided with a filter, and so impurities cannot enter the drive housing with the ambient air and the situation is likewise avoided in which impurities are sucked in when the rotor housing is opened. However, if the filter is contaminated, impurities are nevertheless sucked in and the filter must be cleaned.

A method is known from DE 10 2012 015 420 A1 for operating a spinning device of a rotor spinning machine, in which compressed air is continuously fed to the drive housing, i.e., even during the spinning operation. A static overpressure with respect to the ambient pressure therefore prevails in the drive housing at least during the spinning process. The sucking-in of impurities from the rotor housing into the drive housing can be largely avoided as a result, although a labyrinth seal is required between the drive housing and the rotor housing.

A problem addressed by the present invention is that of providing a method and a spinning device, with which damage to the bearing and the drive caused by impurities, which have been sucked into the drive housing, can be avoided.

SUMMARY

The problem is solved by a method for operating a spinning device of a rotor spinning machine and a spinning device of a rotor spinning machine having the features set forth herein. Additional objects and advantages of the invention will be set forth in part in the following description, or may be obvious from the description, or may be learned through practice of the invention.

The invention provides a method for operating a spinning device of a rotor spinning machine. A yarn can be spun with the aid of the spinning device.

In the method, a spinning rotor of the spinning device, comprising a rotor cup and a rotor shaft, is set into rotation with the aid of a drive, in particular, a single drive, situated in a drive housing. The drive is operatively connected to the rotor shaft in this case. The rotational movement of the drive is therefore transferred, at the rotor shaft, to the spinning rotor. Moreover, the rotor shaft is supported in the drive housing with the aid of a bearing. The bearing contains a radial bearing and an axial bearing. The bearing can be a magnetic bearing. The rotor shaft can be contactlessly supported with the aid of the bearing and, in particular, the magnetic bearing. This is advantageous, since the spinning rotor rotates at a rotation speed of up to 150000 l/min in order to manufacture the yarn. At such high rotation speeds, a contactless bearing is preferred, since friction between a contact bearing and the rotor shaft decelerates the rotation speed and wear occurs between the contact bearing and the rotor shaft. The contactless bearing is particularly susceptible to contamination, however.

Moreover, the rotor cup is situated in a rotor housing, which is acted upon with a vacuum, wherein the vacuum is required for the spinning process.

Moreover, the rotor shaft extends from the rotor housing into the drive housing through a connection opening between the drive housing and the rotor housing. The connection opening is coaxially situated in the drive housing and in the rotor housing, and so the rotor shaft can extend from the drive housing into the rotor housing. In this case, the connection opening can have a larger diameter than the rotor shaft, and so the drive housing and the rotor housing are spaced apart from the rotor shaft in the area of the connection opening. As a result, the rotor shaft can rotate freely in the connection opening, however, a vacuum also forms in the drive housing during the spinning process. Compressed air is fed into the drive housing via an air inlet.

According to the invention, compressed air is fed into the drive housing via the air inlet in order to clean the drive housing and/or the bearing at intervals, preferably, at adjustable time intervals. As a result, dust and fiber particles, which have penetrated the drive housing during the opening of the rotor housing and have settled therein, can be blown off. For this purpose, the compressed air can always be supplied, for example, when a certain amount of dust and fiber particles has settled. This can take place at regular time intervals, for example, after several operating hours of the particular spinning device in each case. Moreover, the compressed air can be fed into the drive housing for as long as it takes for the dust and fiber particles to be removed.

The invention is based on the finding that the contamination of the drive housing cannot be completely prevented, despite various measures to equalize the pressure. In contrast to the related art, in which attempts were constantly made to solve the problem by carrying out a pressure equalization in the drive housing, a pressure equalization is now no longer carried out. Instead, it is accepted that dust and fiber particles settle in the drive housing to a certain extent. With the aid of the supplied compressed air, the dust and fiber particles can be blown off from time to time, however, and so, overall, harmful contamination of the drive housing does not occur. Contamination of the drive and the bearing is reduced as a result and damage to the drive and the bearing can be avoided as a result. It is advantageous in this case that air flows, which could adversely affect the spinning process, are not directed into the drive housing and that a filter and the cleaning thereof are not required.

Preferably, an air flow which is directed, i.e., having a flow direction, is generated in the drive housing in this case. The air flow can be directed by way of an orientation of the air inlet in this case. In addition, the air flow is determined by a shape and/or a geometry of an outlet region of the air inlet. The air inlet can comprise a nozzle, for example, at the outlet region of the compressed air, with the aid of which the air flow can be directed. With the aid of a directed air flow, it is possible to clean the areas of the drive housing, in a targeted manner, which are particularly subjected to a contamination or the accumulation of sucked-in fibers. The air flow is therefore a cleaning air flow.

According to an advantageous embodiment of the method, the stream of compressed air is pulsed during the feeding of the compressed air, i.e., the compressed air is fed in the form of multiple blasts of compressed air following one another at short intervals. As a result, adhered impurities can be detached particularly well.

In an advantageous enhanced embodiment of the invention, the compressed air is fed directly into a bearing gap of the bearing, in particular, of the radial bearing. The bearing gap can be situated between the bearing and the rotor shaft. As a result, dust and fiber particles, which have settled in the bearing gap can be removed. This is particularly important in the bearing gap, since an impurity present there can decelerate the spinning rotor during its rotation or a controlled rotation of the spinning rotor is made difficult. The function of the bearing is also adversely affected, in particular, in the case of a magnetic bearing. As a result, a productivity of the spinning device is adversely affected.

It is advantageous when the compressed air is fed to the drive housing, in particular, the bearing gap, at an end of the rotor shaft facing away from the rotor cup, in particular, in the area of an axial bearing of the bearing. As a result, the flow can be directed through the drive housing from behind, i.e., from the axial bearing, toward the front, toward the rotor housing. As a result, the impurities are blown in the direction of the rotor cup. The air flow can also be designed to be oriented coaxially to the rotor shaft.

Preferably, the compressed air is directed through the connection opening out of the drive housing and into the rotor housing. As a result, the impurities which are carried along by the air flow are also directed out of the drive housing through the connection opening. Provided the cleaning is carried out with the spinning device closed, the impurities, once outside the rotor housing, pass through a vacuum channel of the device into a filter box, from where they can be easily disposed of. When the spinning device is open, the impurities are easily blown forward out of the spinning device.

It is advantageous when the compressed air is fed via an air duct into the drive housing, preferably directly into the bearing gap. With the aid of an air duct, the compressed air can be guided, in a targeted manner, up to the points of the drive housing, which are particularly susceptible to contamination, and it is also possible, in a particularly easy way, to connect the air inlet to a source of compressed air.

It is advantageous when the compressed air is introduced during a spinning process of the spinning device. As a result, the impurities can be removed even during the operation of the spinning device. This can take place at adjustable time intervals. Unproductive downtimes of the spinning device during the cleaning of the drive housing can be avoided as a result.

According to another embodiment, it is advantageous when the compressed air is supplied during an interruption of the spinning process of the spinning device and preferably after the spinning device has been opened. This can take place, for example, after a thread break, a bobbin or can change, or in connection with any other maintenance actions, during which the spinning device must be shut down anyway. It is particularly advantageous when the compressed air is supplied during the cleaning of the spinning rotor, since the spinning device is stopped anyway during this time and any blown-out impurities can be simultaneously carried away with the impurities, which have been detached in the rotor cleaning. Influencings of the magnetic bearing during operation by the cleaning operation are avoided as a result and the disposal of the impurities is particularly simple.

It is particularly advantageous when the compressed air is supplied during the cutting of the yarn during piecing. The cutting of the yarn takes place during piecing in order to be able to feed a yarn end, which has been trimmed in a defined way, back into the spinning device. With respect to the spinning device, the cutting device can therefore be actuated together with the compressed air feed.

It is also advantageous when the compressed air is made available by a maintenance unit. As a result, compressed air devices already present on the maintenance unit can be utilized for providing the compressed air.

In order to feed the compressed air into the drive housing at any point in time, the compressed air can be alternatively made available via a compressed air duct of the rotor spinning machine extending across multiple spinning devices of the rotor spinning machine. Additionally or alternatively, the compressed air can even be made available by a compressed air duct of the spinning device. The compressed air duct can be an air duct, which also provides compressed air for other components of the spinning device and/or the rotor spinning machine. As a result, the compressed air can be provided with little effort.

The invention also provides a spinning device of a rotor spinning machine. The spinning device comprises a rotor housing which can be acted upon with vacuum and in which a rotor cup of a spinning rotor can be situated. With the aid of the rotor cup of the spinning rotor, a yarn can be manufactured on the spinning device from individual fibers. The spinning device comprises a drive housing which is connected to the rotor housing and in which a bearing for a rotor shaft of the spinning rotor is situated. The bearing is preferably a contactless bearing, in particular, a magnetic bearing, and so wear and deceleration of the rotor shaft in the bearing are minimized.

The rotor housing and the drive housing are connected to one another by way of a connection opening for the rotor shaft. The rotor shaft therefore extends from the drive housing into the rotor housing through the connection opening. During the spinning process, the drive housing is therefore also under vacuum. In addition, the spinning device also comprises at least one air inlet, via which compressed air can be fed into the drive housing. Moreover, the spinning device comprises a control unit for controlling the compressed air feed.

According to the invention, the compressed air can be fed into the drive housing with the aid of the control unit at intervals, preferably at adjustable time intervals. With the aid of the compressed air, impurities such as dust and fiber particles, which have settled in the drive housing, can be blown off and, therefore, removed.

The air flow can be directed, and so the air flow has a flow direction. An orientation of an outlet region of the air duct can predefine the flow direction of the air flow. The air duct can comprise a nozzle, for example, at the outlet region, and so the air flow can be directed.

Advantageously, the spinning device can be designed for carrying out one or multiple method steps of the preceding description and/or the following description.

Moreover, it is advantageous when the air inlet is connected to a first end of an air duct. With the aid of the air duct, the compressed air can be guided in the drive housing in a targeted manner to points, which are particularly susceptible to contamination.

It is advantageous when the air inlet or the first end of the air duct is situated in the area of a rear side of the spinning device, i.e., either on a rear side facing the device interior or on a side part of the spinning device connecting the front side and the rear side. Preferably, the air inlet is situated in the area of an axial bearing of the bearing. As a result, flow can advantageously extend through the drive housing from the back toward the front, and so the air flow is directed from the rotor shaft in the direction of the rotor cup. The compressed air can exit the drive housing again through the connection opening. As a result, the impurities can enter the rotor housing and, from there, can be suctioned off by way of the spinning vacuum or can simply be blown out of the rotor housing with the aid of the compressed air. Preferably, the air inlet, i.e., the first end of the air duct, opens directly into a bearing gap of the bearing, in particular, of the radial bearing, and so flow can extend through the bearing gap from the back toward the front and the bearing gap can be cleared of harmful impurities.

It is advantageous when the air duct is situated coaxially to the rotor shaft, at least in its first end or its outlet region. As a result, the air flow can flow along a lateral face of the rotor shaft in order to blow the impurities off the rotor shaft.

It is also advantageous when the air duct opens into a front side of the spinning device via its second end, which faces away from the air inlet. As a result, the compressed air can be supplied manually by an operator as well as by a maintenance unit.

It is advantageous when the air duct comprises a coupling system, at which a maintenance unit of the rotor spinning machine can supply the air duct with compressed air. As a result, the compressed air devices present in the maintenance unit can be utilized for blowing off the contaminants. The coupling system can be situated on a front side of the spinning device, on which the rotor housing is situated. As a result, the maintenance unit traveling along the front side of the rotor spinning machine can apply the compressed air to the air duct along the shortest route.

Advantageously, the air duct comprises a valve on its second end, which faces away from the air inlet. The valve can be situated in the area of the coupling system, for example, as a check valve. As a result, the compressed air can flow in the air duct in only one direction. Alternatively, the valve can even be provided between the air duct and a compressed air duct of the rotor spinning machine.

In order to be able to carry out the blowing-off of the impurities at any point in time and independently of the maintenance unit, it is therefore advantageous when the air duct is connected to a compressed air duct situated in the rotor spinning machine and extending across multiple spinning devices. In this case, the valve can be controlled by a control system of the spinning device and/or the rotor spinning machine, in order to carry out the blowing-off of the impurities with the aid of the compressed air, for example, at time intervals.

It is likewise advantageous when the spinning device comprises a pneumatic cutting device for a yarn produced in the spinning device and the cutting device is likewise connected to the valve. As a result, the cutting device and the compressed air feed can be actuated with the aid of a common valve, whereby the assembly effort and costs are reduced. By way of an appropriate control of the valve, compressed air can be nevertheless guided into the drive housing at any time, as necessary, even when there is no thread present at the moment to be cut.

BRIEF DESCRIPTION OF THE DRAWINGS

Further advantages of the invention are described in the following exemplary embodiments. Wherein.

DETAILED DESCRIPTION

Figure 1:
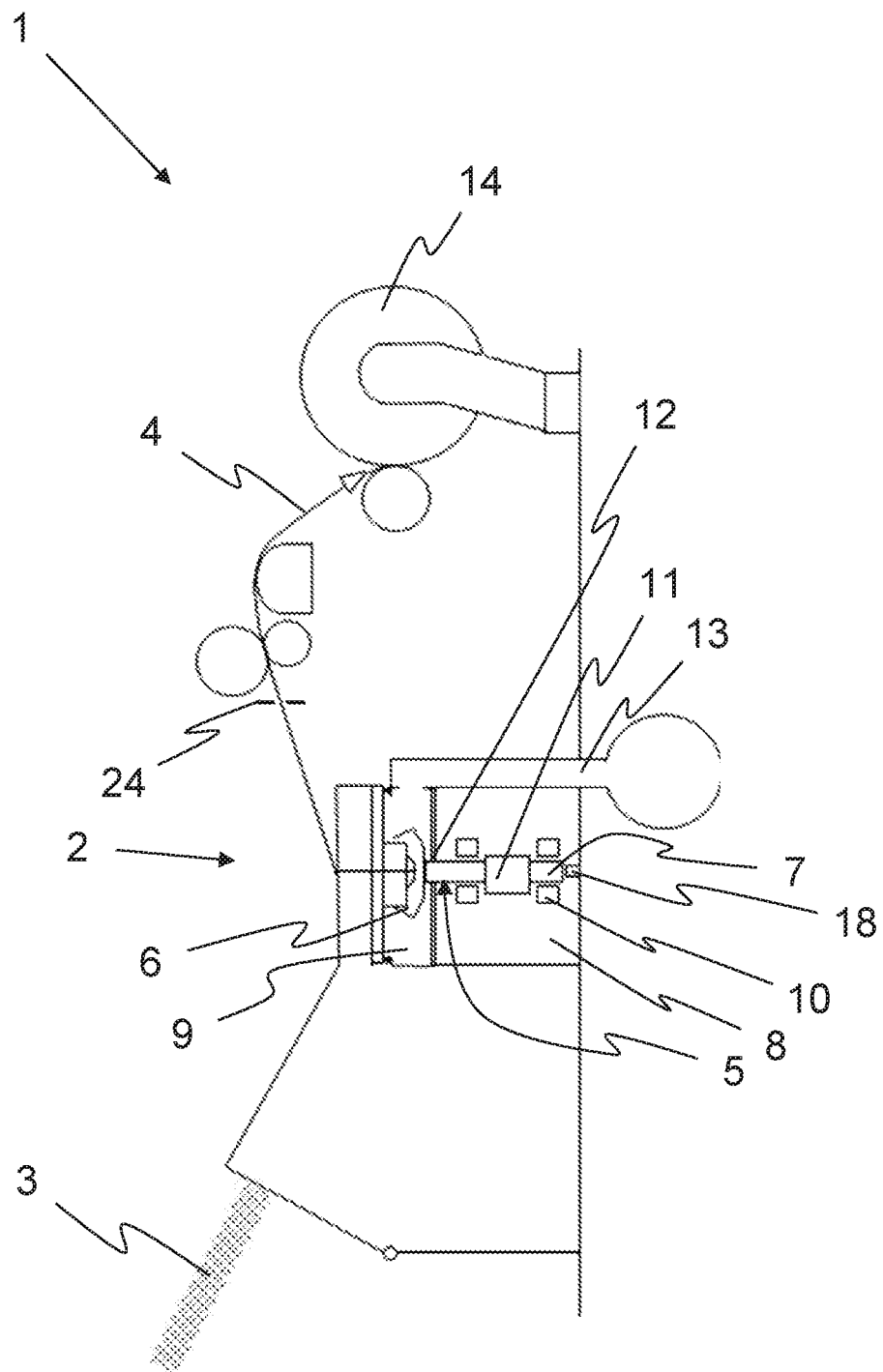
FIG. 1 shows a schematic side view of a rotor spinning machine comprising a spinning device.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a schematic side view of a rotor spinning machine 1 comprising a spinning device 2. With the aid of the spinning device 2, a yarn 4 can be spun from a fiber material 3, which can be wound onto a bobbin 14. The spinning device 2 comprises a spinning rotor 5, with the aid of which the yarn 4 is formed from the fiber material 3 during operation of the rotor spinning machine 1.

The spinning rotor 5 comprises a rotor cup 6 and a rotor shaft 7. In order to form the yarn 4 from the fiber material 3, the fiber material 3 is directed into the rotor cup 6 during a rotation of the spinning rotor 5. The yarn 4 is formed with the aid of the rotation of the spinning rotor 5. The spinning rotor 5 can be driven by a drive 11, which is designed, in particular, as an electric motor-operated single drive. The rotational speed of the spinning rotor 5 can be 150000 l/min or higher in this case, and so high demands are placed on a bearing 10 for the spinning rotor 5. The bearing 10 and the drive 11 are situated in a drive housing 8 in the present exemplary embodiment. Moreover, the rotor shaft 7 is at least partially situated in the drive housing 8 and extends through a connection opening 12 into a rotor housing 9, in which the rotor cup 6 is situated. Due to the arrangement of the rotor cup 6 in the rotor housing 9, into which the fiber material 3 is introduced, and due to the arrangement of the bearing 10 for the rotor shaft 7 in the drive housing 8, the bearing 10 can be protected against fiber fly in the rotor housing 9. The bearing 10 contains a radial bearing which is preferably designed as a contactless bearing 10, in particular, as a magnetic bearing. A bearing gap 15 (see FIGS. 2 and 3) is formed between the radial bearing 10 and the rotor shaft 7, which is particularly sensitive to the penetration of impurities. The bearing gap 15 is an air gap. Moreover, the bearing 10 contains an axial bearing 18 for the spinning rotor 5.

The rotor spinning machine 1 further comprises a vacuum duct 13 which is connected to the rotor housing 9 in order to be able to apply a vacuum to the rotor housing 9. The vacuum is required for the spinning process.

Since the drive housing 8 is connected to the rotor housing 9 with the aid of the connection opening 12, a vacuum also prevails in the drive housing 8 during the operation of the spinning device 2. As a result, fiber particles and dust particles can penetrate the drive housing or can even be sucked into the drive housing both during the spinning operation and, to a particular extent, during the opening of the spinning device. Over time, fiber particles and dust particles can not only adversely affect the function of the drive and the bearing, they can also damage the drive and the bearing.

Figure 2:
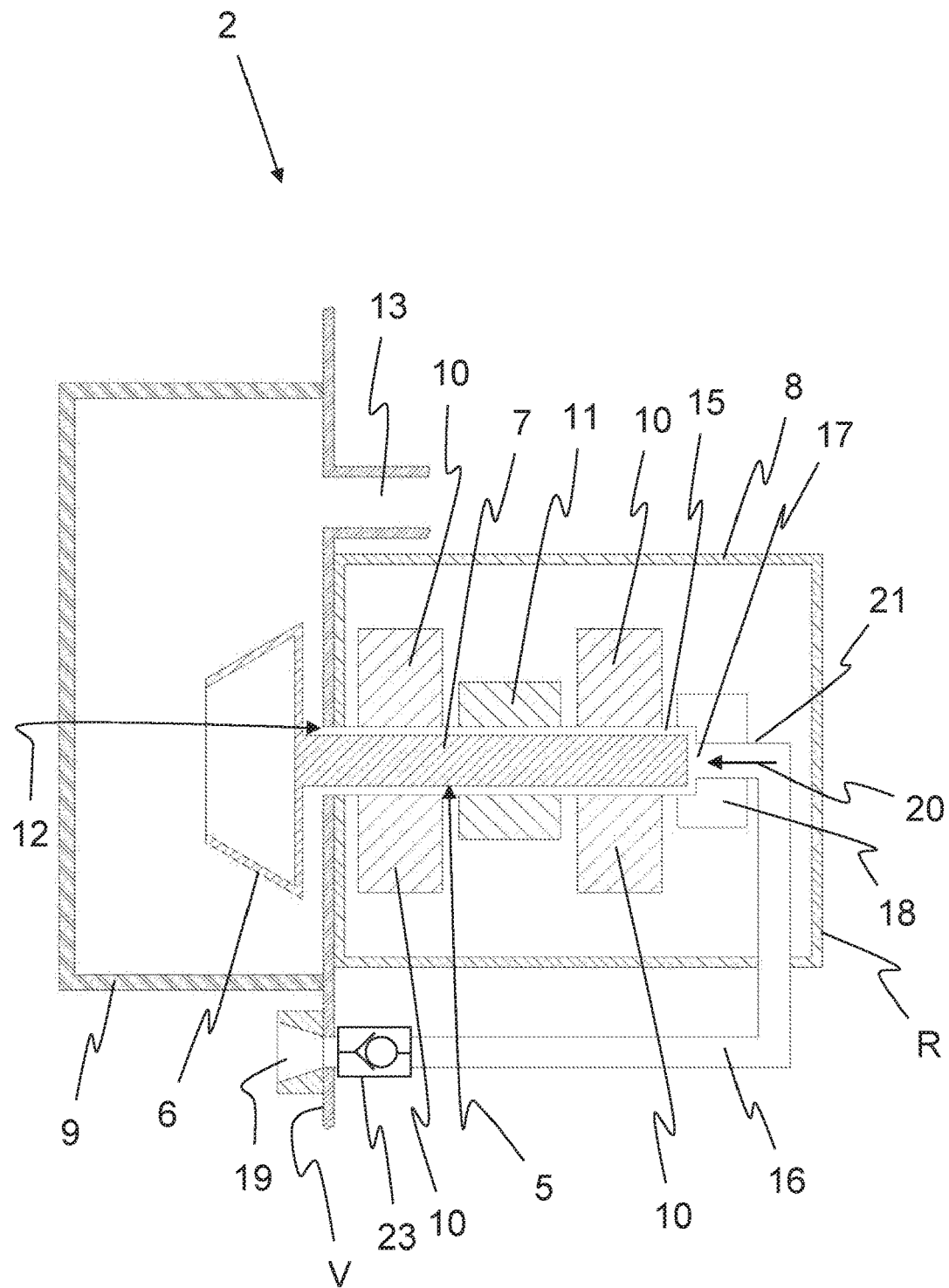
FIG. 2 shows a cutaway view of an exemplary embodiment of a spinning device comprising an air inlet and an air duct.

FIG. 2 shows a cross section of the spinning device 2. The drive housing 8 comprises an air inlet, which is connected to a first end of an air duct 16 in this case. Moreover, an axial bearing 18 is situated in the drive housing 8 in order to support the spinning rotor 5 in its axial direction. In order to clean the spinning rotor 5, the bearing 10, the bearing gap 15, and/or the axial bearing 18, the spinning device 2 comprises the air duct 16, via which compressed air can be fed into the drive housing 8 in order to generate an air flow 20 in intervals. Impurities, which have penetrated the drive housing 8 can be blown off with the aid of the air flow 20.

According to the present exemplary embodiment, at least one end section 21 of the air duct 16, which is situated in the area of an exit opening 17 of the air duct 16, i.e., a first end of the air duct 16, is situated coaxially to the rotor shaft 7. As a result, the compressed air can be introduced directly axially into the bearing gap 15 and, here, flows around the rotor shaft 7 in the bearing gap 15. It is also conceivable, however, to situate the end section 21, for example, perpendicularly to the rotor shaft 7, and, therefore, to feed the compressed air to the bearing gap 15 from a radial direction. Moreover, the air duct 16, in particular, including the end section 21, which is situated in such a way that the air flow 20 flows in the direction of the rotor cup 6. Impurities situated in the bearing 10, in the axial bearing 18, in the bearing gap 15, and/or on the rotor shaft 7 can thereby be blown into the rotor housing 9.

In order to be able to apply compressed air to the air duct 16, the air duct 16 comprises a coupling system 19 on the second end of the air duct 16 facing away from the air inlet or the end section 21, according to the exemplary embodiment of FIG. 2. The coupling system 19 is situated on a front side V of the spinning device 2, according to FIG. 2. A rear side R of the spinning device 2 is situated on the side opposite the front side V. A maintenance unit for the rotor spinning machine 1, which is not shown here, can be coupled to the coupling system 19, in order to apply compressed air to the air duct 16. As a result, an air compressor of the maintenance unit can be accessed. The cleaning is preferably carried out when a maintenance action is to be carried out on the spinning device anyway and, therefore, the maintenance unit is required at the spinning device. For this purpose, the second end of the air duct 16, i.e., the air inlet, is provided with a valve 23, specifically a check valve in this case.

Figure 3:
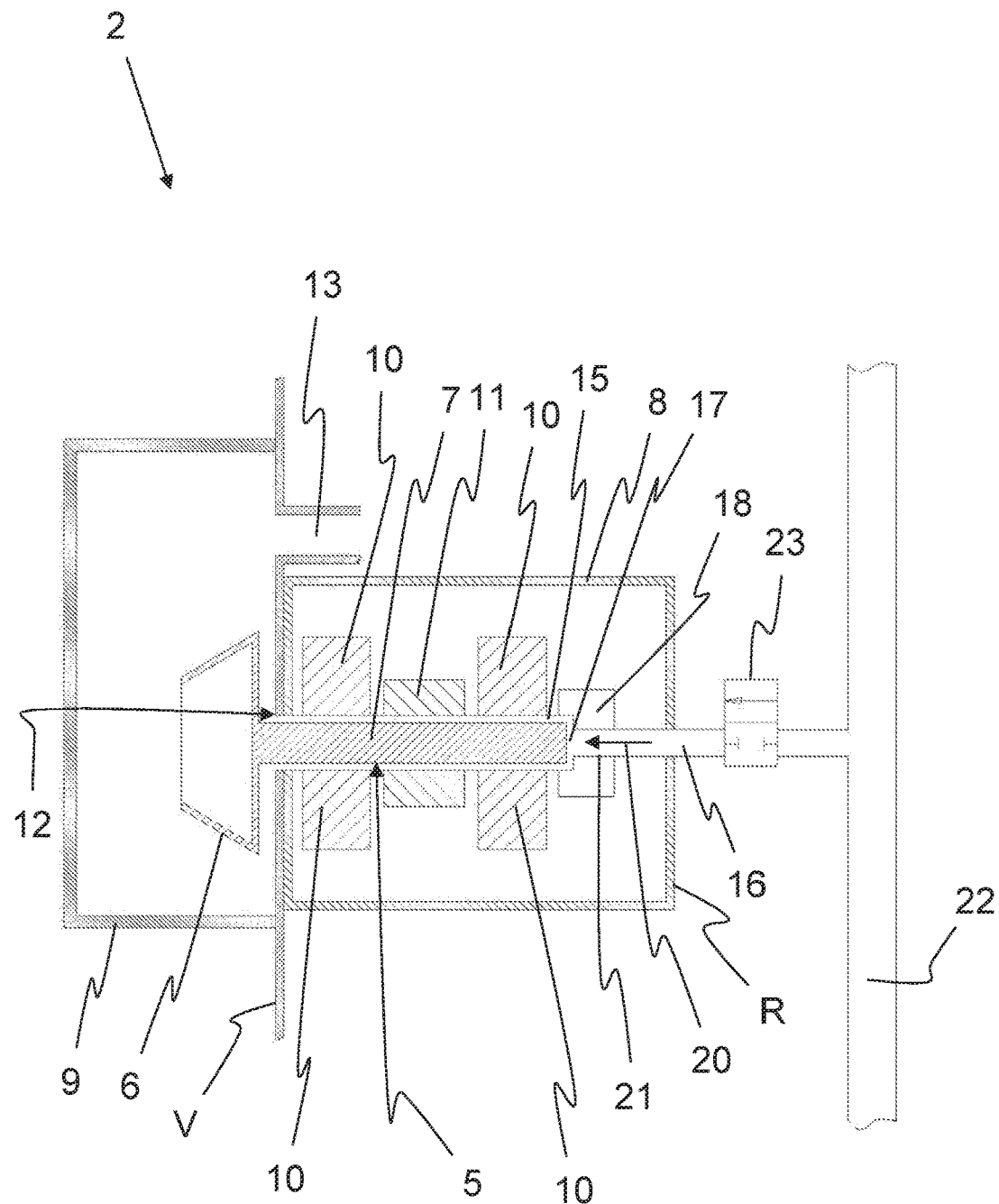
FIG. 3 shows a cutaway view of a further exemplary embodiment of a spinning device comprising an air inlet and an air duct.

FIG. 3 shows a further exemplary embodiment of the spinning device 2, in the case of which an air inlet of the drive housing 8 is connected to a first end of an air duct 16. In this case, the air duct 16 is connected, at its second end facing away from the air inlet, to a compressed air line 22, which extends across multiple spinning devices 2, is designed as an annular conduit, and is connected to each of the individual spinning devices 2 via tap lines. Naturally, the compressed air line 22 extending across multiple spinning devices 2 does not necessarily need to be designed as an annular conduit. The compressed air line 22 could be likewise designed as a tap line.

According to the present exemplary embodiment, a valve 23, which can have two settings, for example, is situated in the air duct 16, in particular, at the second end of the air duct 16, which faces the air inlet. According to FIG. 3, the valve 23 is in a blocking position. In the other position, the compressed air from the compressed air duct 22 can reach the air duct 16. Moreover, the valve 23 can be controlled by a control system of the rotor spinning machine 1, which is not shown here, when compressed air is to be applied to the air duct 16 in order to generate the air flow 20. With the aid of the compressed air duct 22, compressed air can be applied to the air duct 16 at any point in time. In this case as well, the compressed air is introduced directly into the bearing gap 15 of the bearing 10 again. With respect to this design, it is advantageous that the cleaning of the bearing gap or of the drive housing can take place at any time and independently of a maintenance unit.

In each of the exemplary embodiments of FIGS. 2 and 3, the cleaning can be carried out both during the operation of the spinning device 2 and with the spinning device 2 at a standstill. Likewise, in both examples, the cleaning can be carried out with the spinning device 2 open or closed. In any case, it is advantageous that air is blown through the bearing gap 15 from the rear toward the front toward the rotor housing 9.

Figure 4:
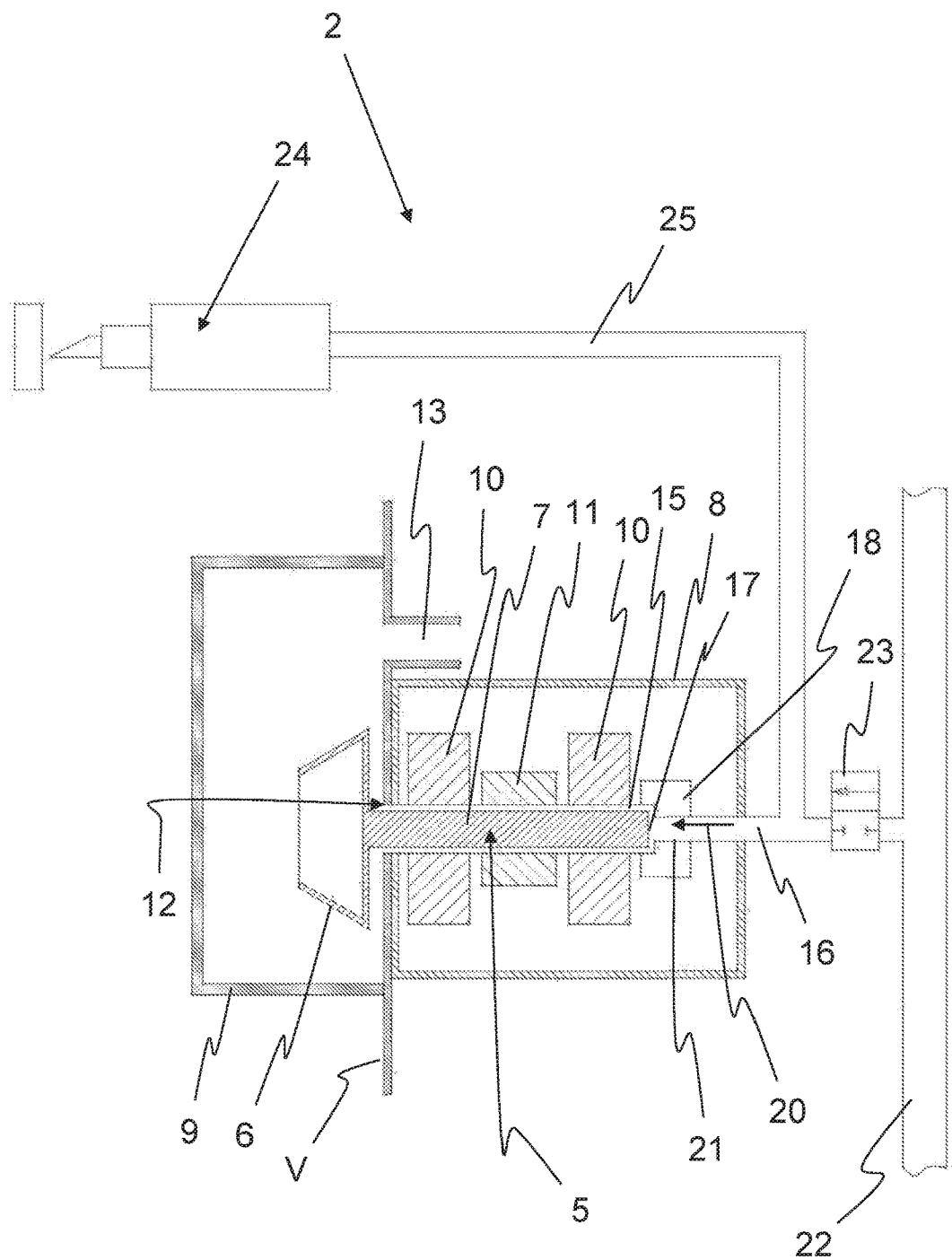
FIG. 4 shows a cutaway view of a further exemplary embodiment of a spinning device comprising an air inlet, an air duct, and a cutting device.

FIG. 4 shows a further exemplary embodiment of the spinning device 2, on which a cutting device 24 is additionally situated for cutting a yarn 4 to be pieced. The spinning device 2 essentially corresponds to that shown in FIG. 3, and so only the differences from FIG. 3 will be discussed in the following.

The cutting device 24 of the present spinning device 2 is utilized for the defined trimming of the yarn 4, in order to be able to return the yarn 4, possibly after a yarn-end preparation, into the spinning device 2 for piecing. The present cutting device 24 can be pneumatically actuated and, therefore, can be advantageously jointly acted upon with the compressed air feed into the air duct 16 by the valve 23. For this purpose, the cutting device 24 is connected to the air duct 16 with the aid of a branch line 25. Due to the actuation with the aid of a common valve 23, only one common activation is required for the valve 23, and so the spinning device 2 can therefore be cost-effectively manufactured and operated.

The present invention is not limited to the represented and described exemplary embodiments. The direct feeding of the compressed air into the bearing gap 15 is to be understood merely as an example. Additionally or alternatively, other areas of the drive housing can also be cleaned in the described way. Further modifications within the scope of the claims are also possible, as is any combination of the features, even if they are represented and described in different exemplary embodiments.

LIST OF REFERENCE CHARACTERS 1 rotor spinning device
2 spinning device
3 fiber material
4 yarn
5 spinning rotor
6 rotor cup
7 rotor shaft
8 drive housing
9 rotor housing
10 bearing
11 drive
12 connection opening
13 vacuum duct
14 bobbin
15 bearing gap
16 air duct
17 exit opening
18 axial bearing
19 coupling system
20 air flow
21 end section
22 compressed air duct
23 valve
24 cutting device
25 branch line
V front side
R rear side

The invention claimed is:

1. A method for operating a spinning device of a rotor spinning machine in which a spinning rotor comprising a rotor cup and a rotor shaft is set into rotation with the aid of a drive situated in a drive housing, the drive operatively connected to the rotor shaft, the rotor shaft supported in the drive housing by a bearing, the rotor cup situated in a rotor housing to which vacuum is applied, the rotor shaft extending between the drive housing and the rotor housing through a connection opening such that when a vacuum is drawn in the rotor housing during a spinning process, a vacuum is also drawn in the drive housing, the method comprising:
feeding compressed air into the drive housing via an air inlet at intervals to clean the drive housing and the bearing;
directing the compressed air with impurities from the drive housing and the bearing into the rotor housing for subsequent removal from the rotor housing; and
wherein the compressed air is fed into the drive housing at an end of the rotor shaft directly into a bearing gap of the bearing so as to flow axially along the rotor shaft in the bearing gap.

2. The method as in claim 1, wherein the compressed air is fed via an air duct into the drive housing directly into the bearing gap.

3. The method as in claim 1, wherein the compressed air is fed into the bearing gap coaxially with the rotor shaft and is directed out of the drive housing and into the rotor housing through the connection opening.

4. The method as in claim 1, wherein the compressed air is supplied during an interruption of the spinning process of the spinning device.

5. The method as in claim 1, wherein the compressed air is supplied during the spinning process of the spinning device.

6. The method as in claim 1, wherein the compressed air is supplied by a travelling maintenance unit.

7. The method as in claim 1, wherein the compressed air is supplied via a compressed air duct that extends across multiple spinning devices of the rotor spinning machine.

8. A spinning device of a rotor spinning machine, comprising:
a spinning rotor comprising a rotor cup and a rotor shaft, the rotor cup situated in a rotor housing to which vacuum is applied during a spinning process;
a drive housing, and a drive within the drive housing and operatively connected to the rotor shaft;
the rotor shaft extending between the drive housing and the rotor housing through a connection opening such that when a vacuum is drawn in the rotor housing during the spinning process, a vacuum is also drawn in the drive housing;
the rotor shaft supported in the drive housing by a bearing wherein a bearing gap is defined between the rotor shaft and the bearing;
an air inlet through which compressed air is fed into the drive housing at an end of the rotor shaft directly into the bearing gap so as to flow axially along the rotor shaft in the bearing gap, wherein feed of the compressed air is controlled so as to be fed at intervals into the drive housing; and
wherein the air inlet is disposed such that the compressed air removes impurities from the bearing and the drive housing and is directed into the rotor housing for subsequent removal from the rotor housing.

9. The spinning device as in claim 8, wherein the air inlet is connected to a first end of an air duct.

10. The spinning device as in claim 9, wherein the air inlet is situated at a rear side, and the air inlet opens into a bearing gap of the bearing.

11. The spinning device as in claim 9, wherein a second end of the air duct opens into a front side of the spinning device opposite from the air inlet.

12. The spinning device as in claim 11, wherein the air duct comprises a coupling device configured to connect with a maintenance unit that supplies the compressed air to the air duct.

13. The spinning device as in claim 11, wherein the air duct comprises a valve at its second end.

14. The spinning device as in claim 9, wherein the air duct is connected at a second end to a compressed air duct that extends across multiple spinning devices of the rotor spinning machine.

15. The spinning device as in claim 14, further comprising a pneumatic cutting device for a yarn produced in the spinning device, the pneumatic cutting device and the air duct connected to the compressed air duct via a valve.

* * * * *